United States Patent [19]
Goldstein

[11] 3,914,602
[45] Oct. 21, 1975

[54] PLUTONIUM MONITOR
[75] Inventor: Norman P. Goldstein, Delmont, Pa.
[73] Assignee: Westinghouse Electric Corporation, Pittsburgh, Pa.
[22] Filed: Nov. 14, 1973
[21] Appl. No.: 415,603

[52] U.S. Cl. .............. 250/253; 250/364; 250/366
[51] Int. Cl. ............................................. G01t 1/20
[58] Field of Search .......... 250/253, 303, 363, 366, 250/369, 393, 460, 364

[56] References Cited
UNITED STATES PATENTS
| | | | |
|---|---|---|---|
| 2,892,091 | 6/1959 | Sawle | 250/364 |
| 3,105,149 | 9/1963 | Guitton et al | 250/253 |
| 3,767,915 | 10/1973 | Battist | 250/366 |

OTHER PUBLICATIONS

"Measurement of Photon to Alpha Ratio for Plutonium Isotopes" by K. L. Swinth; Nucleonics in Aerospace, 1968.

Primary Examiner—Harold A. Dixon
Attorney, Agent, or Firm—M. P. Lynch

[57] ABSTRACT

A coincidence measuring circuit responding to the output signals from first and second scintillation counters adapted respectively to respond to alpha particles and X-rays produced by a monitored environment provides reliable detection of plutonium in the presence of other radioactive elements such as radon and its daughter products.

3 Claims, 1 Drawing Figure

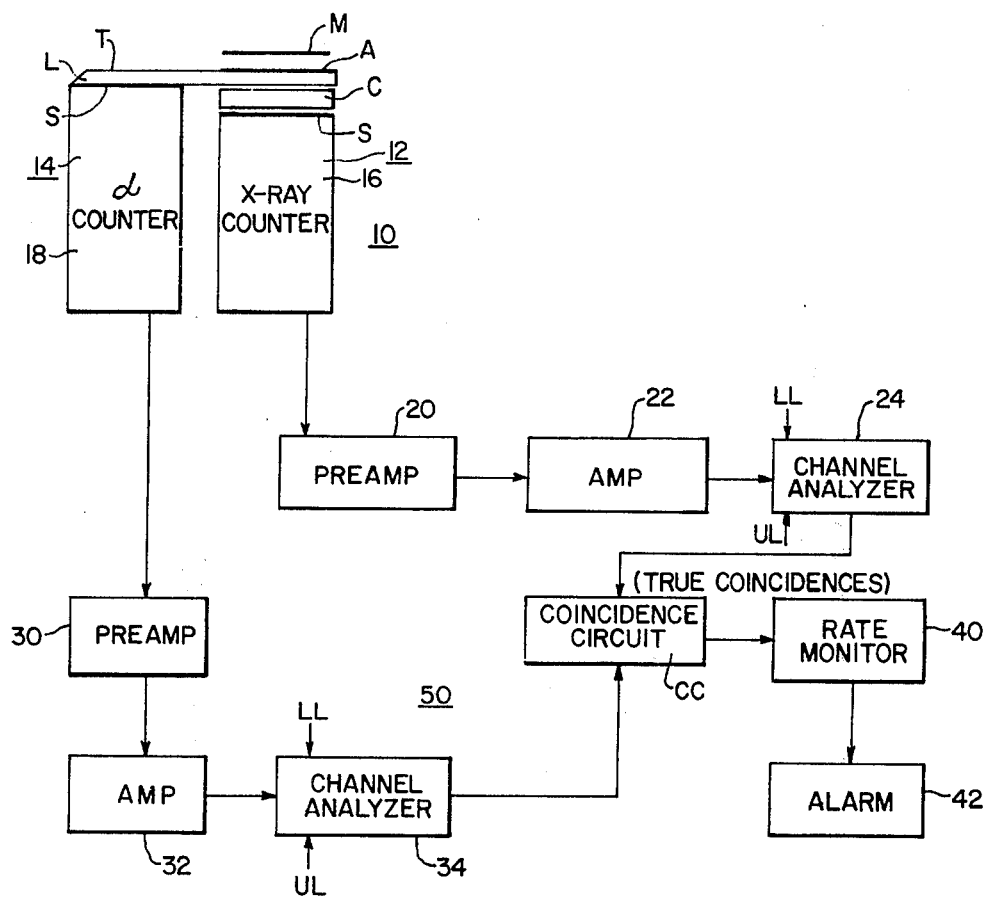

3,914,602

PLUTONIUM MONITOR

BACKGROUND OF THE INVENTION

Due to the toxic nature of plutonium, the biologically safe limit of plutonium is very low. The ever increasing use of plutonium fuel establishes an important requirement to monitor the air in plutonium fuel processing plants and in reactors using plutonium fuel to assure that the maximum permissible concentration is not exceeded. A technique commonly employed involves the incorporation of an alpha counter in a standard air particulate monitor to detect the alpha particles given off by plutonium particles which are deposited on a filter. A problem arises however due to the fact that a significant amount of radon in the air cannot be conveniently separated from the plutonium. Inasmuch as the activity from radon, and its daughter products, is often many times greater than the maximum permissible activity for plutonium, and since radon and its daughter products also emit alpha particles, the counts derived from the radon and its daughter products will be much greater than the counts produced by the plutonium thus adversely affecting an accurate determination of the plutonium concentration.

There is described in the publication "Measurement of the Photon to Alpha Ratio for Plutonium Isotopes," by K. L. Swinth, in Nucleonics in Aerospace, Plenum Press, New York, 1968 a technique for measurement of plutonium alphas and X-rays. It is the object of the present invention to utilize a coincidence technique in a plutonium monitor to provide accurate discrimination of plutonium from radon and its daughter products in order to satisfy the requirement for an accurate plutonium monitor.

Constructing a satisfactory plutonium monitoring system is difficult due to the fact that the maximum permissible concentration (MPC) of plutonium, Pu, is very low, i.e., $Z \times 10^{-12}$ $\mu$Ci/ml of air, and the presence of radon and its daughter products in the air constitutes a background which is hard to separate from the plutonium. The reference to radon includes both $222_{Rn}$ from $238_U$ and $220_{Rn}$ from $232_{Th}$. In addition, this background is not a constant condition but rather varies widely from day to day and from place to place depending on the atmosphere and ground conditions. It is because of these variables that a plutonium monitor without provisions for separating the radon and plutonium signals does not prove satisfactory.

SUMMARY OF THE INVENTION

The plutonium monitoring technique and apparatus disclosed hereafter in reference to the accompanying drawing circumvents the problems posed by the variables identified above. A study of the plutonium and radon disintegration schemes shows that in the case of plutonium, a fraction of the emitted alphas are accompanied by low energy X-rays, while no such correlation occurs in the disintegration of radon. Thus by using two detectors in coincidence, one for the alpha emissions and the other for the X-rays, the presence of plutonium can be distinguished and detected even in the presence of substantial activity from radon. The presence of the radon will only contribute to an increased chance coincidence rate which is significantly smaller than the coincidence rate realized from the maximum permissible activity of plutonium.

The technique and apparatus disclosed herein makes use of the fact that alpha emitting plutonium isotopes give off 17 keV X-rays in coincidence with alphas while no such coincidences occur for radon or its daughter products. Thus, elimination of the radon background can be achieved by a plutonium monitor whose principle of operation relies on the coincidence of X-rays and alphas.

It has been determined experimentally through the operation of the plutonium monitor operating in accordance with the technique disclosed herein that for the plutonium isotope $239_{Pu}$ approximately 4 percent of the alphas produced are accompanied by X-rays. The average mixture of Pu isotopes typically found in Pu fuel yields an X-ray/alpha ratio of about 7 percent. In a monitor of the type illustrated wherein a single set of counters is used the coincidence/disintegrations corresponds to approximately 1.5 percent. If a second set of counters is employed this can be improved to approximately 5 percent thus resulting in increased sensitivity of the monitor.

Evaluation of the same technique in the presence of a radon source indicated that radon and its daughter products contribute essentially no true coincidences.

DESCRIPTION OF THE DRAWING

The invention will become more readily apparent from the following exemplary description in connection with the accompanying drawing which is a schematic illustration of a plutonium monitor constructed in accordance with the invention and including an electrical schematic illustration of a coincidence circuit for processing the signals developed by the plutonium monitor.

DESCRIPTION OF THE PREFERRED EMBODIMENT

Referring to FIG. 1 there is schematically illustrated a plutonium monitor 10 comprised of an X-ray detector 12 and an alpha detector 14. The detectors 12 and 14 are typically illustrated to be photomultiplier tubes 16 and 18 with the end viewing surfaces S exposed to a plutonium environment and operating to transmit signals corresponding to the X-ray and alpha emissions within the environment to a coincidence circuit 50. In the preferred embodiment of FIG. 1 the end viewing surfaces S are modified to render detector 12 responsive to X-ray emissions and detector 14 responsive to alpha emissions.

Optically coupled to the end viewing surface S of the photomultiplier tube 16 is a crystal C, typically CsI(Na), of a diameter approximating the diameter of the end viewing surface S and of a thickness of approximately one millimeter. Other suitable crystals include NaI (Tl) and CaFz. Inasmuch as alpha emitting plutonium isotopes give off 17 keV X-rays in coincidence with alphas while no such alpha-X-ray coincidence occur for radon or its daughter products, the thickness of the crystal C is chosen such that approximately 95 percent of the impinging 17 keV X-rays will interact in the crystal C. Furthermore, gamma rays of energy greater than 0.3 MeV will have less than a 2 percent probability of interaction in a crystal of this thickness. Thus, the selection of the crystal and crystal thickness can significantly minimize the chance coincidence rate attributable to radon and its daughter products. A thin aluminum coated lucite plate L is optically coupled to the end viewing surface S of the photomultiplier tube 18 and extends across the end viewing surfaces of the photomultiplier tube 16. An alpha detecting coating A, herein represented as a layer of ZnS(Ag), is coated on the surface of the lucite plate L which is remote from the end viewing surfaces S of the photomultiplier tubes.

Lucite material was selected because it has the necessary optical properties to transmit the light from the ZnS coating while at the same time exhibiting little tendency toward scintillation. The lucite plate L serves the double purpose of transmitting the light from the alpha detecting layer A to the appropriate photomultiplier tube 14 while preventing beta particles emitted by the plutonium environment from reaching the X-ray sensitive crystal C. The thin aluminized layer T disposed on the surface of the lucite plate L serves to render the plutonium monitor insensitive to light. Typically the plutonium is in particulate form and thus can be collected by blowing sampled air through a moving filter M such that the plutonium is deposited on the filter M at one position and the continuous movement of the paper carries the activity so deposited past the counter array as illustrated in the embodiment. In order for coincidences to be observed, the X-ray crystal C and the alpha detecting coating A must see the same part of the filter paper M on which the plutonium is deposited. Thus the alpha detecting coating A is located above the X-ray crystal C in spite of the fact that the alpha detecting photomultiplier tube 18 is located beside the X-ray detecting photomultiplier tube 16. The light flashes emitting from the alpha detecting coating A resulting from incident alphas are transmitted to the alpha detecting photomultiplier tube 18 by the lucite plate L. The pulse output from the photomultiplier tubes 16 and 18 resulting from impinging X-ray and alphas respectively, is transmitted to the coincidence circuit 50. The pulse output from the X-ray detector 12 is amplified by a preamplifier 20, an amplifier 22 and is subsequently supplied to a single channel analyzer 24. Similarly the output pulses from the alpha detector 14 are amplified by preamplifier 30, amplifier 32 and subsequently supplied to single channel analyzer 34. Typical commercially available units to satisfy the functions of the preamplifiers, amplifiers and single channel analyzers include respectively the Model 113 ORTEC Preamplifier, Model 440 ORTEC Filter Amplifier and the Model 420 ORTEC Timing Single Channel Analyzer. The single channel analyzers 24 and 34 each include an upper and lower level setting such that the single channel analyzers 24 and 34 can be rendered sensitive only to input signals occurring within the limits established by the upper and lower levels. The single channel analyzers 24 and 34 can be thought of essentially as comparator circuits requiring an input signal to exhibit a predetermined characteristic such as a magnitude, in order to result in an output signal from the single channel analyzer for transmission to the coincidence detector CC. The single channel analyzers require that the magnitude of an input signal be between the predetermined upper and lower values before an output signal is generated.

In the embodiment of FIG. 1 the lower level limit LL of the single channel analyzer 24 is set to represent the lower end of the 17 keV X-ray peak while the upper level UL is set at the upper edge of the 17 keV peak so as to render the single channel analyzer 24 sensitive to the signals developed in response to this previously identified critical energy level while rendering the signal channel analyzer 24 insensitive to signals resulting from high energy gammas.

The lower level LL of the signal channel analyzer 34 is set at a level as low as possible, but above a level representative of the gamma interactions in the alpha detecting layer A. The upper level UL is set to include the remainder of the alpha spectrum. The single channel analyzer 34 thus transmits output signals to the coincidence detector CC in response to input signals occurring within the limits established by the lower level and upper level references.

The coincidence detector CC, which can be typically implemented through the use of ORTEC Universal Coincidence Module Model 418A, responds to the coincidence of signals received from the single channel analyzers 24 and 34 by producing an output signal. There are a number of occurrences other than that attributable to plutonium which can produce coincidences. Thus it is a question of the relative rate at which coincidences occur which is useful in determining the presence or absence of plutonium. Thus the output signals from the coincidence circuit CC are applied to a rate monitoring circuit 42 which determines the rate at which coincidences occur over a given period of time. The rate monitoring circuit can be typically implemented through the use of a scaler or counter circuit set to respond to a predetermined count. If the number representing the rate of coincidences exceeds a predetermined value representative of the coincidence rate for plutonium, thus indicating the presence of plutonium as monitored by the plutonium monitor 10, the coincidence rate circuit 42 transmits an actuating signal to the alarm circuit 42. If the number of coincidences occurring within a predetermined period of time is less than the value representative of plutonium, then the circuits are cleared and the counting process is repeated. One of the sources of non-plutonium coincidences comes from "chance coincidences" which result from the chance overlap in time of unrelated counts. For instance, if the rates in the alpha and X-ray photomultiplier tubes 16 and 18 are high as a result of a very high concentration of radon then it is possible for the chance rate to reach a moderate fraction of the expected plutonium coincidence rate.

I claim:

1. Apparatus for distinguishing alpha emitting plutonium isotopes from radon and its daughter products in a predetermined environment, comprising, first means including a photomultiplier tube and an X-ray scintillation crystal operatively coupled to the viewing surface of said photomultiplier tube to monitor the X-ray emissions in said predetermined environment, second means including a photomultiplier tube and, an alpha scintillation means positioned in a spaced apart relationship with said X-ray scintillation crystal so as to view said predetermined environment, light conducting means extending from between said X-ray scintillation crystal and said alpha scintillation means to the viewing surface of said photomultiplier tube of said second means, said photomultiplier tube of said first means generating an output signal representative of the X-ray scintillations occurring in said X-ray scintillation crystal and the photomultiplier tube of said second means generating an output signal representative of the alpha scintillations occurring in said alpha scintillation means.

2. Apparatus as claimed in claim 1 wherein said means extending between said X-ray scintillation crystal and said alpha scintillation means to the viewing surface of the photomultiplier tube of said second means comprises a lucite plate.

3. Apparatus as claimed in claim 1 further including circuit means operatively connected to said photomultiplier tubes of said first and second means to evaluate the coincidence rates of the alpha and X-ray emissions occurring in said predetermined environment to distinguish the presence of alpha emitting plutonium isotopes from radon and its daughter products.

* * * * *